July 26, 1938.  W. J. FLURY  2,124,772
WATER CIRCULATING FISHING TOOL
Filed June 1, 1936
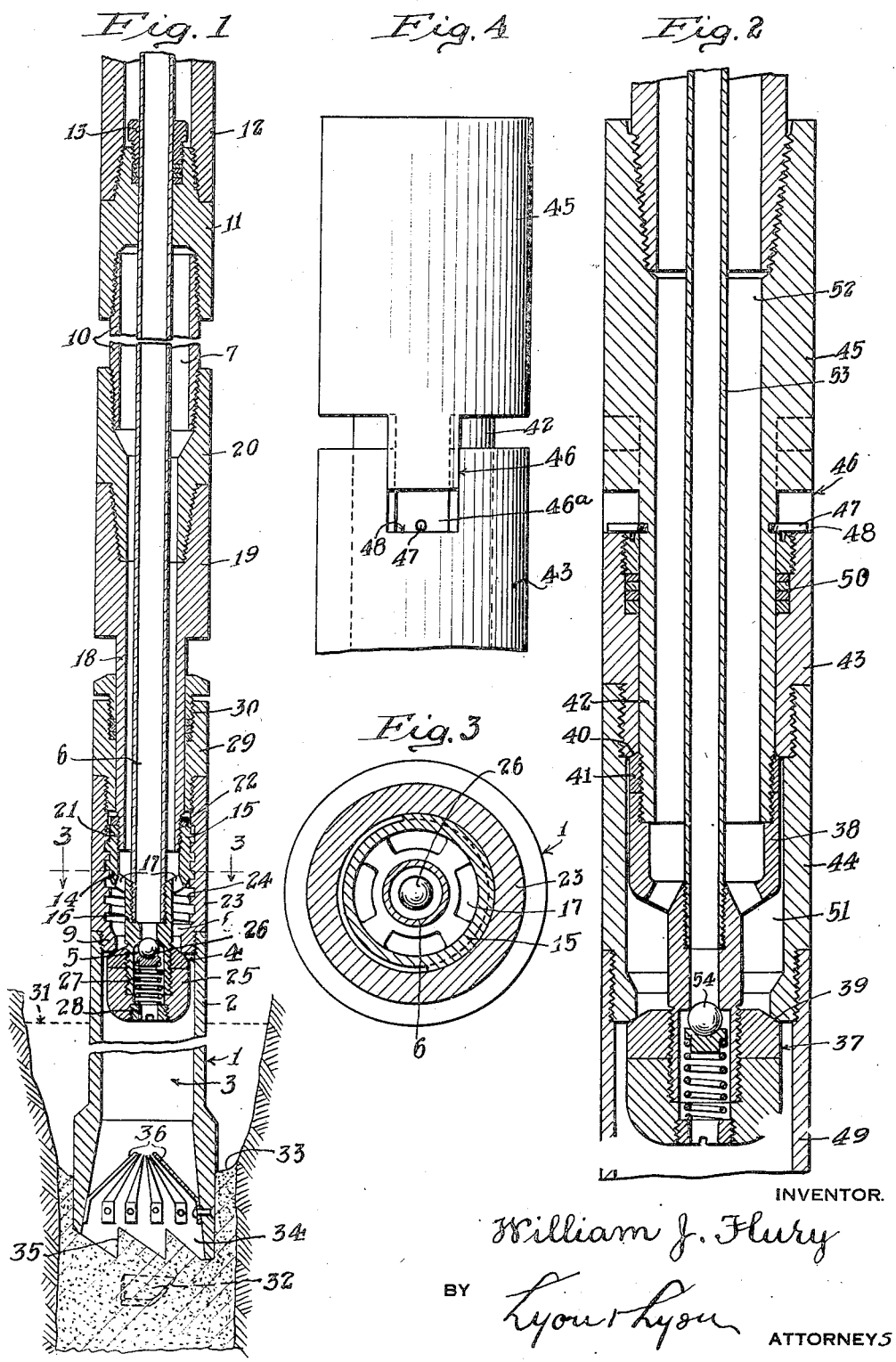
INVENTOR.
William J. Flury
BY Lyon & Lyon
ATTORNEYS

Patented July 26, 1938

2,124,772

UNITED STATES PATENT OFFICE 2,124,772

WATER CIRCULATING FISHING TOOL

William J. Flury, Long Beach, Calif.

Application June 1, 1936, Serial No. 82,714

4 Claims. (Cl. 294—86)

This invention relates to fishing tools such as used at the bottom of a well for recovering lost tools, or parts of tools. Unless such a "fish" is removed it may become caught in boring tools of certain types, and cause their injury, incurring expense and delay in the well boring operations. Such a lost tool part or "fish" may be out of line with the axis of the well and not within reach of ordinary fishing tools. And, furthermore, it may be covered with material so that the fishing tool cannot reach it.

The general object of this invention is to provide a fishing tool having special means for recovering a fish buried at the well bottom; also to provide means which in operation will tend to bring the fish substantially into line with the axis of the well.

A further object of the invention is to provide a tool of this type with means for bringing it into operation through the agency of a rotation of the tool string, or a vertical jar.

Further objects of the invention will appear hereinafter.

The invention consists in the novel parts and combination of parts to be described hereinafter, all of which contribute to produce an efficient water circulating fishing tool.

A preferred embodiment of the invention is described in the following specification, while the broad scope of the invention is pointed out in the appended claims.

The invention also resides in the method described herein of recovering a "fish".

In the drawing:

Figure 1 is a vertical section through a fishing tool embodying my invention, and also showing parts of the tool string carrying the same. This view also indicates the manner in which the fishing tool operates to uncover a buried "fish". This view is a rotary type of the invention in which the tool is operated by a sudden rotation of the tool string.

Figure 2 is a view similar to Figure 1, but illustrating a "jar" type of tool, that is to say, a type in which the tool is operated by a down jar.

Figure 3 is a horizontal section on a large scale through the tool illustrated in Figure 1, the section being taken about on the line 3—3 of Figure 1.

Figure 4 is a side elevation of the upper portion of the casing of the fishing tool shown in Figure 2, the lower portion being broken away.

In practicing this invention I provide an overshot shoe carried on the tool string. This shoe is lowered into position above the "fish". The tool is provided with means for circulating water down onto the fish, thereby washing away the material burying the fish, and rendering the "fish" accessible to the fishing tool.

It sometimes happens that a lost tool or "fish" will be located eccentrically, that is, over to one side in the hole at the well bottom and away out of line with the axis of the well. My invention and method of circulating water in the vicinity of the "fish" will operate to bring such a "fish" back into proximity to the well axis and into position to be reached by the fishing tool.

Referring more particularly to the parts, 1 represents the shoe in Fig. 1, the lower portion of which is formed into an expanded mouth, the upper part consisting of a tubular shank 2, the interior of which constitutes a receiving chamber 3. When the tool is in operation at the well bottom, the pressure existing there is communicated through the mouth of the shoe to the receiving chamber 3. In accordance with my invention I provide means for suddenly relieving this pressure at the upper end of the receiving chamber, thereby causing an inrush of material carrying the "fish" into the shoe. This is preferably accomplished by means of a valve 4, the construction being such that circulating water can be conducted down past the valve before the tool is operated to open the valve.

For this purpose the valve 4 is provided with a central opening 5 communicating with water tubing 6 that carries the water down past an airtight chamber 7 that communicates with the space 8 just above the valve seat 9.

The air chamber 7 is the interior of a tubular member 10 carrying a head 11 at its upper end that is connected to the lower end of the tool string 12. The well pressure must be excluded from this air chamber 7; for this reason a stuffing-box 13 is provided for the circulation tubing as it passes through the head 11.

In the embodiment illustrated in Fig. 1, the valve 4 is attached by threads to the lower end of a valve-carrier 14, the upper end of which is in the form of a short externally threaded sleeve 15 having a reduced neck 16 to which the valve 4 is attached, the shoulder between these parts being provided with port means 17 that opens communication to the air chamber 7 through a tubular casing member 18, the upper end of which is in the form of a head 19 connected to the lower head 20 of the air chamber.

The sleeve 15 of the valve carrier is attached by threads 21 and a jam nut 22 to the lower end of the tubular member 18.

The valve seat 9 is preferably formed at the lower end of an outer sleeve 23 that is secured to the upper end of the shoe 1, and that is provided with internal threads 24 engaging the external threads of the valve carrier.

The valve 4 is threaded into the lower end of the neck 16 and adjustably fixed in place by means of a cap-nut 25.

A check-valve 26 preferably in the form of a ball is provided for checking upward flow through the circulation pipe 6, and this ball may come upon a seat formed in the bore of the neck 16, and is preferably urged against its seat by a small compression spring 27 seating below against a ferrule 28.

A head 29 is secured to the upper end of the sleeve 23, and a stuffing-box 30 is provided in this head around the member 18 to prevent any leakage of the well pressure into the space 8 above the valve 4 and within the sleeve 23.

Suppose that when the fishing tool is to be used the well hole is sanded up to a level such as that indicated by the dotted line 31. The "fish" 32 would then be inaccessible to a fishing tool, and would require a bailing operation. But with my method, by circulating water down the pipe 6 the material over the "fish" can be carried away in the circulating water, bringing the well bottom level to a point such as the point 33 from which the "fish" can be drawn into the shoe. In the embodiment shown in Fig. 1, the shoe 2 preferably has teeth 34 at its lower end with abrupt shoulders 35 that engage the material at the well bottom and hold the shoe against rotation when the tool string is suddenly rotated in the proper direction; in this case, in a right-hand direction. The thread 24 being a high pitch right-hand thread, causes the valve 4 to move down and quickly off its seat. This suddenly relieves the pressure at the upper end of the receiving chamber, thereby causing a violent inrushing movement of the material under, or embedding, the "fish" 32. In this way the "fish" is carried up into the receiving chamber. Suitable means, for example, resilient fingers 36 converging upwardly are provided for retaining the "fish" in the shoe.

It is obvious that if the "fish" happens to be located off to one side and is a valuable tool that must be recovered, it can be "washed in" to the center of the hole by continued water circulation, because the water circulation tends to produce a conical hole below it, and the tool will gravitate to its center.

In the embodiment disclosed in Figs. 2 and 4, the valve 37 that corresponds to valve 4 is connected to the lower end of a valve-carrier 38. This construction presents a seat 39 for the valve 37, and also presents a second seat 40 cooperating with a ring 41 secured to the lower end of a tubular member 42 that slides through a head 43 secured to the upper end of the outer sleeve 44. The outer sleeve 44 corresponds to the sleeve 23 and houses the valve-carrier 38. The member 42 has an enlarged head 45 at its upper end that has a tongue and groove connection 46 with the head 43. Suitable means is provided for securing the valve 37 on its seat. In the present instance I employ two frangible pins 47 secured in the side of member 42 just above the shoulders 48 at the bottoms of the slots 46a of the tongue and groove connections. When the lower end of the shoe 49 rests over the "fish" the valve 37 is opened by a down-jar on the tool string, carrying the head 45 down and shearing the pins 47. A stuffing-box 50 is provided in the head 43 for packing the body of the sleeve member 42 to keep the well pressure from leaking through to the space 51 above the valve, which space communicates with the air-tight chamber 52 corresponding to the air chamber 7. Through this air chamber the circulating tubing 53 passes down, being packed off through a head like the head 11 of Fig. 1. The lower end of shoe 49 has a mouth like the mouth 2 with spring fingers like the fingers 36 for retaining the "fish" when caught. A spring-closed ball valve 54 is also provided, preferably as illustrated.

As in the other embodiment, the circulation of water down the tube 53 will assist in rendering the "fish" accessible to the shoe.

It is understood that the embodiment of the invention described herein is only one of the many embodiments this invention may take, and I do not wish to be limited in the practice of the invention, nor in the claims, to the particular embodiment set forth.

What I claim is:

1. In a fishing tool for use at the bottom of a deep well, the combination of a shoe having a tubular shank with a receiving mouth for the "fish" at its lower end, to be positioned over the "fish", said tool having a relatively movable part with respect to said shoe, a valve seat and a valve within the said tubular shank, a member above the shoe having an air chamber therein, an inner tube for circulating water passing down through the said air chamber for conducting circulating water down to the valve, said valve having a closure with an opening through the same through which the circulating water can pass downwardly through the receiving chamber of the shoe to wash away material covering the "fish", a check valve below said opening, said shoe and relatively movable part cooperating when moved relatively to each other, to open the first-named valve to relieve the well pressure within the receiving chamber and thereby cause an inrush of material due to the well pressure passing into the receiving chamber and carrying the "fish" therewith, said check valve operating to prevent the relief of pressure up the inner tube, and means at the lower end of the shoe for retaining the "fish".

2. In a fishing tool for use at the bottom of a deep well, the combination of a shoe having a tubular shank with a receiving mouth for the "fish" at its lower end, to be positioned over the "fish", a valve seat and a valve within the said tubular shank, a member above the shoe having an air chamber therein, an inner tube for circulating water passing down through the said air chamber for conducting circulating water down to the valve, said valve having a closure with an opening through the same through which the circulating water can pass downwardly through the receiving chamber of the shoe, and thereby washing away material covering the "fish", means for opening the valve to relieve the well pressure within the receiving chamber and thereby causing an inrush of material due to the well pressure, passing into the receiving chamber and carrying the "fish" therewith, means at the lower end of the shoe for retaining the "fish", and a check valve carried by the first-named valve in the said opening for the circulating water, said check valve opening downwardly and operating to prevent any relief of pressure up the circulating pipe when the first-named valve is opened.

3. In a fishing tool for use at the bottom of a deep well, the combination of a shoe having a mouth to be positioned over the "fish" and having a tubular shank with a receiving chamber therein for the "fish", a sleeve secured to the upper end of the said shank having a valve-seat and having internal threads, a valve carrier having external threads engaging with the threads of said sleeve, a valve carried thereby to seat upon said seat, a member connected with the said valve carrier and having an air-tight chamber therein, to be connected to the tool string, said shoe having means for engaging the well bottom to hold the same substantially fixed when the tool string is rotated, said threaded engagement between the valve carrier and the said sleeve enabling the rotation of the tool string to move the valve off its seat, thereby causing an inrush of material for carrying the "fish" into the receiving chamber, means for retaining the "fish" in the receiving chamber, said valve having a closure with an opening therethrough, a circulating tube extending down through the said air chamber and connected with the opening through the said valve, a check valve for closing the said opening for the circulating water through the said valve, with means for holding the check valve normally on its seat, said tube affording means for circulating water down through the said receiving chamber, and thereby washing away material covering the "fish" before the first-named valve is opened.

4. In a fishing tool for use at the bottom of a deep well, the combination of a shoe having a tubular shank with a receiving mouth for the "fish" at its lower end to be positioned over the "fish", a valve seat within the said tubular shank, a valve carrier mounted to slide longitudinally with respect to the shoe, a valve mounted on the valve carrier, a sleeve attached to the upper end of the shank and having internal threads, said valve carrier having external threads engaging the internal threads of the sleeve, a coupling head secured to the upper end of the sleeve, a tubular member secured to the upper end of the valve carrier and mounted to slide through said coupling head, means for packing the tubular member at said packing head, said tubular member having a coupling head at its upper end, a tubular member connected with the coupling head and having an air-tight chamber therein, tubing for circulating water extending down through the interior of the air chamber with means for packing the same where it enters the said air chamber from above, said circulating tubing attached at its lower end to the valve carrier and enabling circulating water to be passed down through the valve and through the receiving chamber to wash away material covering the "fish", a check valve for checking upward pressure through said circulating tube, the said tubular member having an air chamber, and having means for attaching the same to the tool string, and said parts cooperating when the tool string is rotated and the shoe in engagement with the well bottom, to open the valve and cause an inrush of material into the receiving chamber carrying the "fish" into the same, said receiving chamber having means for retaining the "fish", said valve carrier having port means for opening communication between the air chamber and the valve.

WILLIAM J. FLURY.